(12) United States Patent
Mäkelä

(10) Patent No.: US 7,594,194 B2
(45) Date of Patent: Sep. 22, 2009

(54) PORTRAYAL OF NAVIGATION OBJECTS

(75) Inventor: Mikko Mäkelä, Tampere (FI)

(73) Assignee: Nokia Corporation, Espoo (FI)

( * ) Notice: Subject to any disclaimer, the term of this patent is extended or adjusted under 35 U.S.C. 154(b) by 734 days.

(21) Appl. No.: 10/671,430

(22) Filed: Sep. 24, 2003

(65) Prior Publication Data

US 2005/0066286 A1 Mar. 24, 2005

(51) Int. Cl.
*G06F 3/14* (2006.01)
*G06F 3/048* (2006.01)

(52) U.S. Cl. .................. 715/864; 715/251; 715/815; 715/837; 715/838; 715/854; 715/855

(58) Field of Classification Search .................. 715/764, 715/765, 835, 810, 836, 837, 840, 846, 852, 715/251, 815
See application file for complete search history.

(56) References Cited

U.S. PATENT DOCUMENTS

| | | | | | |
|---|---|---|---|---|---|
| 5,367,626 | A | * | 11/1994 | Morioka et al. | 715/837 |
| 5,471,578 | A | * | 11/1995 | Moran et al. | 715/863 |
| 5,479,602 | A | * | 12/1995 | Baecker et al. | 715/838 |
| 5,623,592 | A | * | 4/1997 | Carlson et al. | 715/866 |
| 5,740,390 | A | * | 4/1998 | Pickover et al. | 715/835 |
| 5,742,779 | A | * | 4/1998 | Steele et al. | 715/839 |
| 5,760,774 | A | * | 6/1998 | Grossman et al. | 715/835 |
| 5,777,616 | A | * | 7/1998 | Bates et al. | 715/837 |
| 5,801,699 | A | * | 9/1998 | Hocker et al. | 715/837 |
| 5,917,488 | A | * | 6/1999 | Anderson et al. | 715/838 |
| 5,920,313 | A | * | 7/1999 | Diedrichsen et al. | 715/767 |
| 6,031,532 | A | * | 2/2000 | Gourdol et al. | 715/837 |
| 6,034,689 | A | * | 3/2000 | White et al. | 715/854 |
| 6,100,888 | A | * | 8/2000 | Gourdol et al. | 715/837 |
| 6,133,913 | A | * | 10/2000 | White et al. | 715/719 |
| 6,154,205 | A | * | 11/2000 | Carroll et al. | 345/684 |
| 6,300,947 | B1 | * | 10/2001 | Kanevsky | 715/866 |
| 6,456,305 | B1 | * | 9/2002 | Qureshi et al. | 715/800 |
| 6,459,441 | B1 | * | 10/2002 | Perroux et al. | 715/837 |
| 6,459,442 | B1 | * | 10/2002 | Edwards et al. | 715/863 |
| 6,469,722 | B1 | * | 10/2002 | Kinoe et al. | 715/837 |
| 6,469,723 | B1 | * | 10/2002 | Gould et al. | 715/837 |

(Continued)

FOREIGN PATENT DOCUMENTS

CN 1273499 A 11/2000

(Continued)

OTHER PUBLICATIONS

Microsoft Computer Dictionary 5th Edition, p. 260-261.*

(Continued)

*Primary Examiner*—Steven B Theriault
(74) *Attorney, Agent, or Firm*—Ware, Fressola, Van Der Sluys & Adolphson LLP (57) ABSTRACT

The invention relates to a method, a device, a computer program product, a browser and a network element for improved portrayal of navigation objects (1-1 . . . 1-6), wherein at least two navigation objects (1-1 . . . 1-6) are combined into one combined navigation object (4), wherein said combined navigation object (4) is presented, and wherein said at least two navigation objects (1-1 . . . 1-6) are presented, if said combined navigation object (4) is selected.

28 Claims, 3 Drawing Sheets

U.S. PATENT DOCUMENTS

| | | | |
|---|---|---|---|
| 6,556,217 B1* | 4/2003 | Makipaa et al. | 345/667 |
| 6,570,597 B1* | 5/2003 | Seki et al. | 715/835 |
| 6,756,999 B2* | 6/2004 | Stoakley et al. | 715/779 |
| 6,775,659 B2* | 8/2004 | Clifton-Bligh | 707/1 |
| 6,822,663 B2* | 11/2004 | Wang et al. | 715/854 |
| 6,825,857 B2* | 11/2004 | Harasimiuk | 345/660 |
| 6,832,353 B2* | 12/2004 | Itavaara et al. | 715/744 |
| 6,857,106 B1* | 2/2005 | Brouaux | 715/837 |
| 6,882,755 B2* | 4/2005 | Silverstein et al. | 382/282 |
| 6,891,553 B2* | 5/2005 | White et al. | 715/800 |
| 6,983,424 B1* | 1/2006 | Dutta | 715/800 |
| 6,993,726 B2* | 1/2006 | Rosenholtz et al. | 715/835 |
| 7,086,013 B2* | 8/2006 | Saund et al. | 715/863 |
| 7,203,901 B2* | 4/2007 | Chen et al. | 715/205 |
| 7,231,611 B2* | 6/2007 | Kumhyr et al. | 715/837 |
| 7,246,306 B2* | 7/2007 | Chen et al. | 715/205 |
| 2002/0021308 A1 | 2/2002 | White et al. | |
| 2002/0032745 A1 | 3/2002 | Honda | |
| 2002/0186262 A1 | 12/2002 | Itavaara et al. | |
| 2002/0191031 A1* | 12/2002 | Ricard | 345/838 |
| 2003/0013483 A1* | 1/2003 | Ausems et al. | 455/556 |
| 2003/0017858 A1* | 1/2003 | Kraft et al. | 455/566 |
| 2003/0030678 A1* | 2/2003 | Rosenholtz et al. | 345/838 |
| 2003/0095135 A1* | 5/2003 | Kaasila et al. | 345/613 |
| 2004/0100479 A1* | 5/2004 | Nakano et al. | 345/700 |
| 2004/0100509 A1* | 5/2004 | Sommerer et al. | 345/864 |
| 2004/0103371 A1* | 5/2004 | Chen et al. | 715/513 |
| 2004/0119757 A1* | 6/2004 | Corley et al. | 345/837 |
| 2004/0174396 A1* | 9/2004 | Jobs et al. | 345/810 |
| 2004/0261036 A1* | 12/2004 | Vedbrat et al. | 715/779 |
| 2005/0081241 A1* | 4/2005 | Chen | 725/41 |
| 2005/0210399 A1* | 9/2005 | Filner et al. | 715/767 |
| 2005/0240878 A1* | 10/2005 | Anthony et al. | 715/765 |
| 2006/0020904 A1* | 1/2006 | Aaltonen et al. | 715/850 |

FOREIGN PATENT DOCUMENTS

| | | |
|---|---|---|
| EP | 1 050 846 A2 | 11/2000 |
| JP | 10-222143 | 8/1998 |
| JP | 2000-076473 | 3/2000 |
| JP | 2002-007269 | 1/2002 |
| JP | 2002-175135 | 6/2002 |
| JP | 2003-141022 | 5/2003 |
| JP | 2007-175626 | 7/2007 |
| WO | WO 01/65377 | 9/2001 |
| WO | WO 02/21331 A | 3/2002 |
| WO | WO 02/089010 | 11/2002 |

OTHER PUBLICATIONS

"Architektur und Arbeitsweise eines Web-Browsers" Markus Legner, Jan. 14, 2001.

"Websites professional selbst gestalten" Johann-Christian Hanke, 2003 Franzis Verlag GmbH, pp. 94-114.

English language translation of Japanese Office Action dated Jun. 24, 2008, 3 pages.

Japanese Language Office Action issued in parallel Japanese Patent Application No. 2006-527508 dated Mar. 3, 2009 (2 pages).

English Language translation of Japanese Office Action issued in parallel Japanese Patent Application No. 2006-527508 dated Mar. 3, 2009 (4 pages).

* cited by examiner

PORTRAYAL OF NAVIGATION OBJECTS

FIELD OF THE INVENTION

The invention relates to a method, a device, a computer program product, a browser and a network element for improved portrayal of navigation objects.

BACKGROUND OF THE INVENTION

The ongoing miniaturization of hand-held multi-media devices such as Personal Digital Assistants (PDAs) or mobile phones in recent years appears to be only bounded by the perceptual limits of the human user. This particularly applies to the design of the displays of hand-held devices, with a remarkable trend to increase the relative area of the hand-held device that is consumed by its display. However, the display sizes of hand-held devices are necessarily significantly smaller than the display sizes for which content is usually designed. If for instance content of the World Wide Web (WWW), i.e. web pages formatted according to the Hypertext Markup Language (HTML) or derivatives thereof (such as Extensible HTML (XHTML)), is to be displayed on the hand-held device, it has to be considered that these web pages are normally designed for portrayal on a computer monitor, the dimensions of which are by a factor 8-10 larger than the display dimensions of a hand-held device such as a mobile phone.

Viewing web pages on the display of a hand-held device requires horizontal and vertical scrolling with scroll bars, which is generally experienced as uncomfortable or even annoying for the user of the hand-held device. Consequently, most browsers that are installed in hand-held devices and provide for the interpretation of the web page content offer the possibility to view web pages in a format that is optimized for the display dimensions of the hand-held device.

The well-known technique for this optimization is to scale the web page so that it fits to the width of the display of the hand-held device. This scaling technique for web pages in order to avoid horizontal scrolling is for instance disclosed in US patent publication US 2002/0021308 A1.

HTML and XHTML standards specify a so-called image map object, that is used to define selectable areas inside an image. Such an image map is exemplarily depicted in FIG. 1. The image map is basically an image 1 that is composed of several image regions 1-1 . . . 1-6, where at least some of said image regions 1-1 . . . 1-6 basically work as image hyperlinks. An image hyperlink is an HTML object defining an image that is selectable by the user and is associated with a web resource, the Uniform Resource Locator (URL) of which being defined in the anchor hyperreference field of the image hyperlink. When the image is selected, the browser fetches the web resource that is defined in the anchor hyperreference, which may be a web page, a sound, video, etc. Quite similar, textual hyperlinks are HTML tags with selectable text instead of selectable images, and voice hyperlinks are HTML tags with speech input options instead of selectable images.

Figure 1:
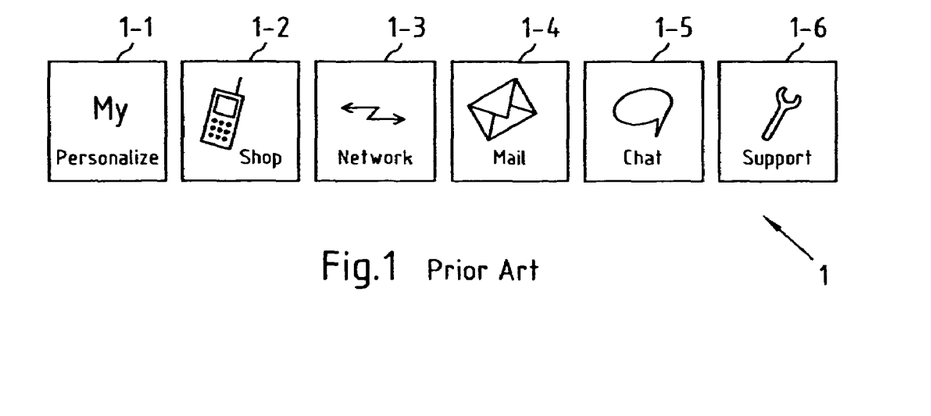
FIG. 1: an unscaled image map according to the prior art.

Within an image map 1, it is also possible to include image regions that are not associated with a web resource and serve as inactive image region only. When the user selects an image region 1-1 . . . 1-6, either by moving a mouse pointer on the image region 1-1 . . . 1-6 and clicking, or by using a touch-screen, keyboard input or a voice command, the browser downloads the web resource that is associated with that image region 1-1 . . . 1-6. That web resource may contain further images, texts, sounds, videos or scripts that then are executed by the browser.

Image maps are widely used on web pages, in particular as web page menus, but also to simplify navigation in huge text documents, e.g. Portable Document Format (PDF) documents and Word documents, or in road maps. In most cases, they are wider/higher than the display width/height of the hand-held device. Consequently, when scaling web pages down to fit to the width/height of the hand-held display, image maps are scaled down as well.

Figure 2:
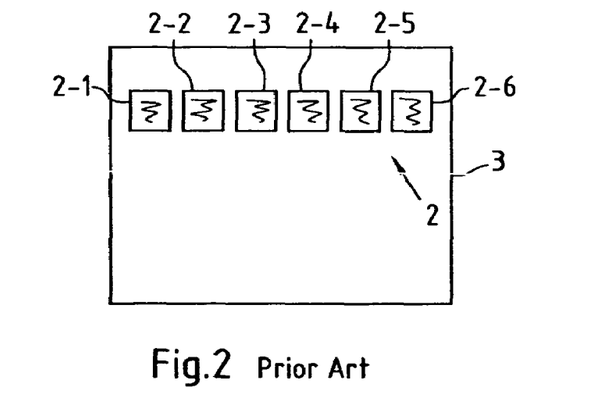
FIG. 2: a scaled image map formatted for a small display according to the prior art.

FIG. 2 depicts the result achieved when scaling is applied to the image map of FIG. 1, which was designed for portrayal on a computer monitor. Apparently, the image regions of the scaled image map, now optimized for portrayal on the display of a hand-held device, are no longer identifiable, and navigation based on the scaled image map is no longer possible.

One way to navigate with such a scaled image map is to rely on the definition of so-called alternative texts for each image region. Alternative texts are optional in the definition of image hyperlinks and image hyperlinks within image maps, and specify a text that appears when the mouse pointer is pointed to an image or image region. In the example of FIG. 2, when moving the mouse pointer to image region 1-4, the browser displays the text "Mail", if the alternative text of this image region 1-4 was defined as "Mail", or displays no text, if the alternative text of this image region 1-4 was not defined.

A further solution to the problem of image maps that have been scaled down beyond recognition is to display the scaled image map in a way that the image hyperlinks within the scaled image map 2 corresponding to image map regions 2-1 . . . 2-6 are deactivated. Instead, the browser extracts the hyperreferences corresponding to each image region 2-1 . . . 2-6 and uses said hyperreferences as hyperreferences of textual hyperlinks, that are displayed next to the scaled image map. However, the text representing the textual hyperlinks can only be based on the alternative texts defined for each image region 2-1 . . . 2-6 within the image hyperlinks, or on the hyperreferences themselves, which are usually Uniform Resource Locators (URLs), which are in general long character strings that do not allow conclusions on the type of target object they refer to.

Finally, some browsers support switching between the display of the scaled web page and the original size web page. When displaying the original size (unscaled) web page, usually horizontal and vertical scroll-bars are required for visual inspection of the web page. Thus it is possible for the user to switch to the original size web page when the scaled web page does no longer allow for navigation due to scaled site maps whose image regions can no longer be identified. However, switching between scaled and unscaled web pages requires advanced operating skills of the user, and represents a rather complicated approach.

SUMMARY OF THE INVENTION

It is thus an object of the present invention to provide a method, a device, a computer program product, a browser and a network element for improved portrayal of navigation objects that overcomes the above-mentioned problems.

It is proposed that a method for improved portrayal of navigation objects comprises combining at least two navigation objects into one combined navigation object, presenting said combined navigation object, and presenting said at least two navigation objects, if said combined navigation object is selected.

A navigation object may be embodied as an element that is selectable by a user, and is associated with a target object in such a way that the target object is executed or displayed upon selection of said selectable element. At least two navigation objects that can no longer be identified and properly selected when being presented as in the prior art are first combined into one combined navigation object. This step of combining may involve transforming said at least two navigation objects into a representation that can be identified and selected by a user. The combined navigation object is then presented. In said combined navigation object, the property of the at least two navigation objects, i.e., that they can be selected and are associated with a target object, may be maintained or removed. In any case, a possibility to select the combined navigation object itself has to be provided. If the combined navigation object is selected by a user, said at least two navigation objects are presented in a way that they can be identified and selected by a user.

According to the method of the present invention, it is preferred that said at least two navigation objects are graphical objects. Graphical objects such as images, parts of images that are contained in image maps or even animated images may be too large to fit the display of a device on which they are to be displayed, so that the graphical objects have to be scaled so that their dimensions fit the display. Scaling may reduce the recognizability of the graphical objects, so that it is advantageous to first combine said at least two graphical objects into a combined graphical object and to present this combined graphical object on the display. The combined graphical object may be branded with an additional icon that indicates that graphical objects have been combined into this combined graphical object. Combining may involve merging said at least to graphical objects into a joint representation, for instance by scaling or other image processing techniques. The combined graphical object then can be selected by a user, for instance by mouse clicking, by a keyboard, by a touchscreen or by voice commands, and only then said at least two graphical objects are displayed, advantageously in a display mode that improves their recognizability.

According to the method of the present invention, it is preferred that said at least two navigation objects are voice objects. Voice objects may for instance be embodied as voice tags or speech input tags. When a certain word or phrase is spoken and recognized by a device, the device executes a certain command being associated with said word or phrase. If said at least two voice objects are too long, they can be combined into one combined voice object, which can be selected by a user (e.g., by speaking the combined voice object), and then said at least two voice objects are presented by the device again, in a way that now speaking the phrase associated with each voice object will cause the device to execute a command that is associated with said respective voice object. For instance, two voice objects of a menu, "News" and "Mail", may be combined into a combined voice object "Menu". If "Menu" is spoken, the device activates the voice objects "News" and "Mail" and waits for respective spoken input to select one or the other of the voice objects.

According to the method of the present invention, it is preferred that said at least two navigation objects are text objects, for instance textual links or text regions in a text document such as a Word document or a PDF document. Similarly, navigation objects may represent parts of tables, diagrams, etc. Said text objects are combined into one combined text object. Said text objects may be character strings that can be selected by a user by mouse clicking, or by keyboard or by touchscreen, or by similar input devices. Combining the text objects into a combined text object then may be accomplished by assigning a more or less descriptive word to said at least two text objects, or by changing the size of the fonts of said at least two text objects and/or by rearranging the text objects. For instance, the word "Menu" may be assigned to the text objects "News" and "Mail" as a combined text object.

According to the method of the present invention, it is advantageous that said combined navigation object (4) is presented in a first display mode, and wherein said at least two navigation objects are displayed in a second display mode, if said combined navigation object is selected. If the navigation objects are of a type that affords display so that a user of a device can recognize a navigation object as such and is able to select it, which is for instance the case with graphical objects, text objects, and may also be the case for voice objects, display of said at least two navigation objects in the standard display mode of the device may cause said at least two navigation objects to be no longer recognizable, for instance if the navigation objects are images that are scaled by the device. It is then advantageous to display the combined navigation object, for instance a scaled representation of said at least two navigation objects, in a first display mode, which may be the device's standard display mode that may involve scaling of all content that is to be displayed. In said first display mode, said at least two navigation objects may no longer be recognizable due to scaling, however, they may be branded with an icon that indicates that the combined navigation objects only represents said at least two navigation objects and that by selecting the combined navigation object, said at least two navigation objects will be displayed in a second display mode, in which improved portrayal of said at least two navigation objects as compared to said fist display mode is possible. This second display mode may for instance be a mode in which said at least two navigation objects are displayed without scaling. Then vertical and/or horizontal scroll bars may be required so that the navigation objects can be completely explored by a user.

According to the method of the present invention, it is further preferred that each of said at least two navigation objects is associated with one respective target object that is displayed or executed upon selection of said respective navigation objects. Navigation in a linked environment is then possible by selection of the navigation object, wherein the target objects may be documents, scripts or multimedia contents.

According to the method of the present invention, it is further preferred that said respective target object that is displayed or executed upon selection of said respective navigation objects is displayed or executed in said first display mode. When a navigation object is selected during its display in the second display mode, the first display mode is invoked to display or execute the target object that the navigation object is associated with. However, in some cases it might be advantageous to display or execute the target object in the second display mode.

According to the method of the present invention, it is further preferred that said navigation objects are defined according to a markup language, in particular the HyperText Markup Language (HTML) or derivatives thereof, and are interpreted by a browser. The navigation objects then may allow navigation in web pages that represent documents written in HTML, as are used in the World Wide Web (WWW). Interpretation of these documents is performed by a browser, which displays each HTML tag in a way that is suited for the display type of the device the browser is installed in.

According to the method of the present invention, it is further preferred that said at least two navigation objects are hyperlinks. Hyperlinks may be image links or voice links or textual links. In particular, image hyperlinks in image maps are to be considered here, i.e. the association of image regions with anchor hyperreferences, so that upon selection of an image region, the content identified by the hyperreference (usually a URL), is displayed or executed by the browser. Also textual hyperlinks in text maps or similar maps may apply here. In the combined navigation object, which may be a scaled representation of the image or text map, the hyperlinks may still be individually selectable or not. In the first case, a user that already knows the structure of the image map can then nevertheless use the individual hyperlinks contained in the map although they are no longer recognizable due to scaling. For selecting the combined navigation object as a whole, then an additional icon may be used.

According to the method of the present invention, it is further preferred that said first display mode is a scaled format display mode, and that said second display mode is an unscaled format display mode. Said first display mode may be the standard mode for the presentation of content on the display, wherein the content that is to be displayed on the display is scaled, so that the width and/or height of the content fits the width and/or height of the display. In contrast, the second display mode does not perform this standard scaling operation in a manner that makes the content unreadable or unrecognizable, which results in that the content may no longer completely fit into the display window. Thus the unscaled format display mode is to be understood as a mode where the recognizability of said at least two navigation objects is maintained, wherein nevertheless a small amount of scaling may be included.

According to the method of the present invention, it is further preferred that said step of combining said at least two navigation objects into one combined navigation object comprises the step of jointly scaling said at least two navigation objects. Scaling is required so that the combined navigation object is in a scaled format and can be displayed in said first display mode, which is a scaled format display mode. The scaling operation may be the same as performed by the browser when scaling the content, which actually contains the at least two navigation objects that have to be combined.

According to the method of the present invention, it is further preferred that in said first display mode, a first display window is used, and wherein in said second display mode, a second display window is used. Said at least two navigation objects are more concisely displayed in a separate region on the display or in a pop-up-window.

According to the method of the present invention, it is further preferred that both said first and second display mode are used in the same display window. Thus two display modes may be applicable in one display window. For instance, a region of the display may be in the first display mode, and the remaining region of the display window may be in the second display mode.

According to the method of the present invention, it is further preferred that in said second display mode, at least one of a horizontal and a vertical scroll bar is provided. If the width or height of said at least two navigation objects, which are displayed in unscaled (original) format, exceeds the width and/or height of the display or pop-up-window, horizontal and/or vertical scroll bars allow for horizontal and/or vertical panning in the unscaled format display mode, respectively.

According to the method of the present invention, it is further preferred that the method further comprises the step of determining whether said at least two navigation objects have to be combined into one combined navigation object or not. The step of combining said at least two navigation objects into a combined navigation objects and the presentation of the combined navigation object is only required if the at least two navigation objects will not be identifiable after scaling according to the scaled format display mode. This can be determined by comparing the dimensions of the original size navigation objects with the dimensions of the display, or by setting a maximum allowable value for the scaling factor that is applied to the at least two navigation objects, or maybe using some pattern recognition algorithm to determine whether the scaled objects are still recognizable for the user, or some algorithm to determine how much visual information is lost in scaling.

It is further proposed that a method for improved portrayal of navigation objects comprises combining at least two navigation objects into one combined navigation object, presenting said combined navigation object, and presenting said at least two navigation objects, if said combined navigation object is selected, wherein said at least two navigation objects are image hyperlinks within an image map contained in a web page, wherein said combined navigation object is represented by a selectable scaled graphical representation of said image map, and wherein said image hyperlinks within said image map are displayed in an unscaled format display mode, if said selectable graphical representation is selected.

It is further proposed that a device for improved portrayal of navigation objects comprises means for combining at least two navigation objects into one combined navigation object, means for presenting said combined navigation object, and means for presenting said at least two navigation objects, if said combined navigation object is selected.

According to the device of the present invention, it is further preferred that said device comprises means of presenting said combined navigation object in a first display mode, and means for presenting said at least two navigation objects in a second display mode, if said combined navigation object is selected.

According to the device of the present invention, it is preferred that the device further comprises means for determining whether said at least two navigation objects have to be combined into one combined navigation object or not.

It is further proposed that a device for improved portrayal of navigation objects comprises means for combining at least two navigation objects into one combined navigation object, means for presenting said combined navigation object, and means for presenting said at least two navigation objects, if said combined navigation object is selected, wherein said at least two navigation objects are image hyperlinks within an image map contained in a web page, wherein said combined navigation object is represented by a selectable scaled graphical representation of said image map, and wherein said image hyperlinks within said image map are displayed in unscaled format, if said selectable graphical representation is selected.

Furthermore, a computer program product directly loadable into a computer readable medium such as the internal memory of a digital computer, comprising software code portions for performing the method steps of any of the above method steps when said product is run on a computer, is proposed. Said digital computer may for instance be the microprocessor that is already integrated in a hand-held device and implements the browser functionality.

Furthermore, a browser for improved portrayal of navigation objects is proposed, that comprises means for combining at least two navigation objects into one combined navigation object, means for presenting said combined navigation object, and means for presenting said at least two navigation objects, if said combined navigation object is selected. Said browser may be integrated in a hand-held device such as a mobile phone or a PDA, or it is integrated in a personal computer or similar devices.

Furthermore, a network element for improved portrayal of navigation objects is proposed, that comprises means for combining at least two navigation objects into one combined navigation object, wherein said combined navigation object is presented by a browser, and wherein said at least two navigation objects are presented by said browser, if said combined navigation object is selected. In some cases it is very useful to perform webpage optimization by an optimization server in the network. Also in that case, the present invention can be applied. With server optimization, it is possible to save a lot of bandwidth by sending the combined navigation object to a browser, e.g. in reduced quality, and then when the user of the browser selects the combined navigation object, the server can send said at least two navigation objects in high quality. This can also be performed in a way that basic browsers that do not support complicated navigation objects such as image maps can nevertheless use navigation that is based on complicated navigation objects. For instance, the combined navigation object may be an ordinary image link to a page, on which the complicated navigation object, e.g. the image map, is represented by ordinary image links that are aligned using HTML tables.

BRIEF DESCRIPTION OF THE FIGURES

These and other aspects of the invention will be apparent from and elucidated with reference to the embodiment described hereinafter. In the figures show.

DETAILED DESCRIPTION OF THE INVENTION

In the figures, the same figure elements will always be denoted by the same numerals.

Figure 3:
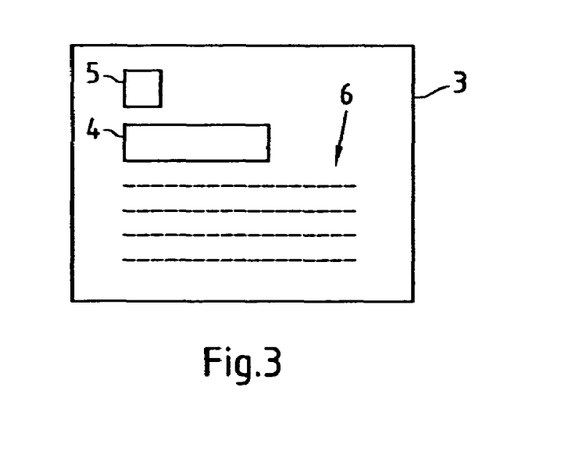
FIG. 3: a combined navigation object according to the present invention.
Figure 4:
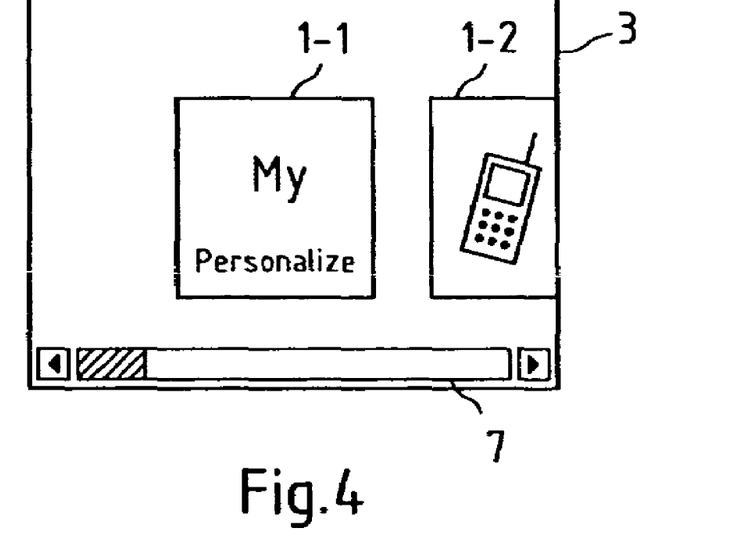
FIG. 4: a presentation of an image map in unscaled format according to the present invention.
Figure 5:
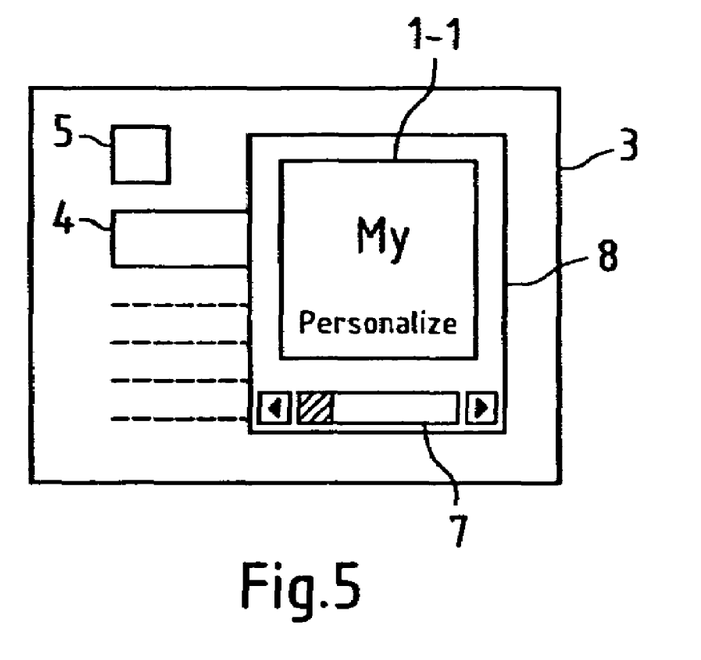
FIG. 5: a presentation of an image map in unscaled format in a pop-up window according to the present invention.

FIGS. 3-5 depict the portrayal of an image map on the display 3 of a mobile phone which can be achieved according to the preferred embodiment of the method of the present invention.

When a web page is to be displayed on the display 3 of a mobile phone, the browser that is integrated in the mobile phone first scales the web page to optimally fit it into the display 3, for instance so that the width of the scaled web page fits into the display 3. The entire web page then is displayed in scaled format display mode. Now, if this web page contains an image map 1, the browser has to decide whether the scaled image map 2 will be unreadable after scaling or not. This can for instance be achieved by checking whether a scaled image map 2 would fit the width of the display in the original size of the image map, or by defining a maximum allowable scaling factor. If it is decided that the scaled image map 2 is readable, no further actions are taken, i.e. the scaled image map 2 is displayed by the browser on the display 3, and if it originally was smaller than the display width, then it is not scaled at all.

In determining whether an image map would fit to the display width in its original size, it might be necessary to consider an additional zooming level that has been selected by a user. For instance, if the user has chosen a zooming level of 200%, the original width of the image map has to be multiplied by an additional factor of 2 when determining whether the zoomed image map fits the width of the display. This is because zooming might force an image map to be scaled, even when it would fit the display width in its original (unzoomed) width. Also, when the zoom level is less than 100%, it might be advantageous to open an image map in its original (unzoomed) size after selection, as zooming usually decreases the image quality/recognizability.

If it is decided that the scaled image map 2 is no longer readable due to the scaling operation, the whole scaled image map is presented as one selectable item 4, as depicted in FIG. 3. In FIG. 3, furthermore the remaining objects 6 of the displayed web page are exemplarily depicted as well. It is graphically presented, for instance with a small icon 5 on top (over the item) or near the selectable item 4, that the image map is not an ordinary image link, but that selecting it opens it in its original size instead. Said small icon may be shown always, or only when the item is focused for instance by moving the cursor on top of it. The individual image links contained in the image map 1 may be maintained in the selectable item 4 or not. It is then possible for the advanced user that already knows the image map 1 to directly select the image links 2-1 . . . 2-6 in the scaled image map 2. However, of course still a possibility is provided to select the selectable item 4 itself, in order to trigger the presentation of the image map 1 in its unscaled format. This property may be assigned to the small icon 5, i.e. by clicking the small icon 5 the presentation of the unscaled image map 1 is triggered.

When the user of the device 9 selects the selectable item 4 by means of mouse pointing and clicking, or by use of a touchscreen, keyboard input or voice command, the image map 1 is opened by the browser in the display 3 in its original format (the unscaled format), as depicted in FIG. 4. This can be performed by clearing the display and depicting only the image map 1, as shown in FIG. 4, or, alternatively, by moving the remaining objects 6 on the currently displayed web page in order to create space for the presentation of the unscaled image map 1 within the web page (not shown). In any case, due to the size of the unscaled image map 1, it may be necessary to provide the display with horizontal and/or vertical scroll bars, so that horizontal and/or vertical panning is possible in order to explore the complete image map 1. A horizontal scroll bar 7 is exemplarily depicted in FIG. 4.

As depicted in FIG. 5, the unscaled image map 1 may be displayed in a pop-up window 8 as well, so that the selectable item 4, the icon 5 and the remaining objects 6 of the web page as currently presented in the display 3 remain unaffected, and are only superposed by the pop-up window 8. This pop-up window may have scroll bars as well, which are exemplarily depicted as horizontal scroll bar 7.

In the unscaled format, the image regions 1-1 . . . 1-6 of the image map 1 now can easily be identified and selected for navigation.

When the viewer closes the view of the unscaled image map 1 without selecting an image region and activating the corresponding image hyperlink, for instance by closing the pop-up window 8 or by pressing the "back" softkey of the browser, the scaled web page with the selectable item 4, the small icon 5 and the remaining objects 6 is again completely visible.

When the viewer selects an image region 1-1 . . . 1-6 from the unscaled image map 1, the browser will fetch the document or will execute the script or multimedia content referred to by the image region 1-1 . . . 1-6 as defined by the anchor hyperreference of the corresponding image hyperlink. In the case of a script, the pop-up window 8 according to FIG. 5 (or original size view of the image map 1 according to FIG. 4) could be closed if the script starts navigation to another web page or changes the appearance of the web page in which the image map 1 is contained. If the script only changes the appearance of the image map 1 that is currently displayed, the view could stay on the unscaled image map 1 in the pop-up window 8 according to FIG. 5 (or original size view according to FIG. 4).

The step of displaying the unscaled image map 1 either in original size within the scaled web page, original size view according to FIG. 4 or in a pop-up window may not be included in the browser's navigation history, i.e. if the viewer navigates between documents in the navigation history (for instance by back/forward commands or a history list), the original size view of the image map 1 may not be available.

Figure 6:
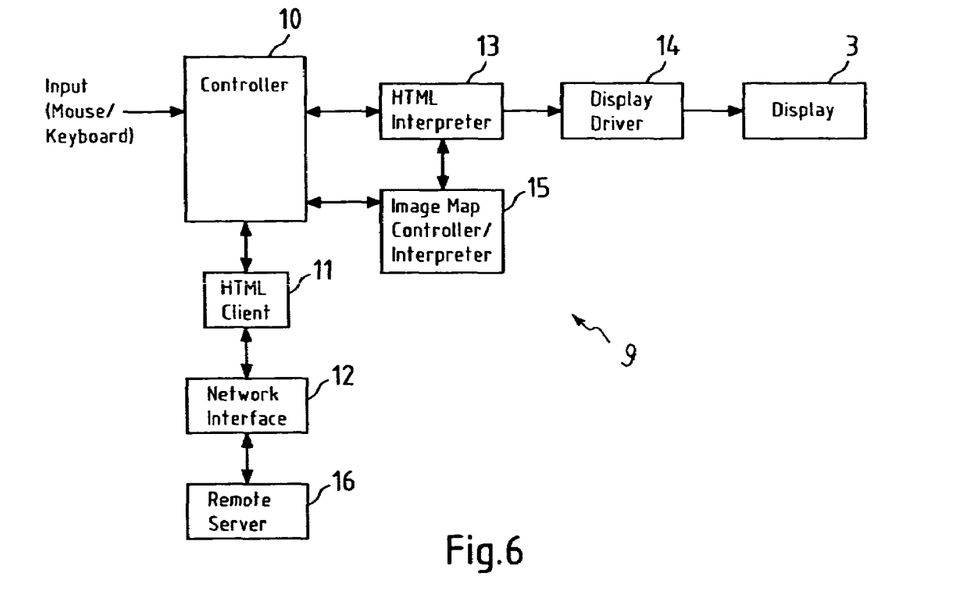
FIG. 6: the logical structure of a device for improved portrayal of navigation objects according to the present invention.

FIG. 6 depicts the logical structure of a device for improved portrayal of navigation objects according to the present invention. The device 9 comprises the standard components required to implement a browser functionality: The controller 10 controls the function of the browser and receives input from a viewer for example via the keyboard, touchscreen, mouse interaction, or voice commands, e.g. a new URL that is to be loaded. The HTML client 11 provides services to the controller 10, in particular fetching of new HTML pages via the network interface 12, which is connected to a remote web server 16. If the device 9 is a hand-held device, said connection will generally be a wireless connection. The HTML interpreter 13 is responsible for the display of HTML pages on the display 3, which is controlled by the HTML interpreter 13 via a display driver 14. The HTML interpreter parses the HTML code and provides the display driver 14 with the corresponding results. In particular, scaling of web pages to fit into the display 3 is performed by the HTML interpreter 13 and display driver 14. As additional logical component, according to the present invention, an image map controller/interpreter instance 15 is contained in the device 9, which supports the HTML interpreter 13 and the controller 10 and in particular adds functionality to combine navigation objects into combined navigation objects, to control the display of combined navigation objects in the first (scaled format) display mode and the display of navigation objects in the second (unscaled format) display mode, to determine, together with the controller 10, if a combined navigation object has been selected by a viewer, and to determine whether said navigation objects have to be combined into a combined navigation object or not.

Figure 7:
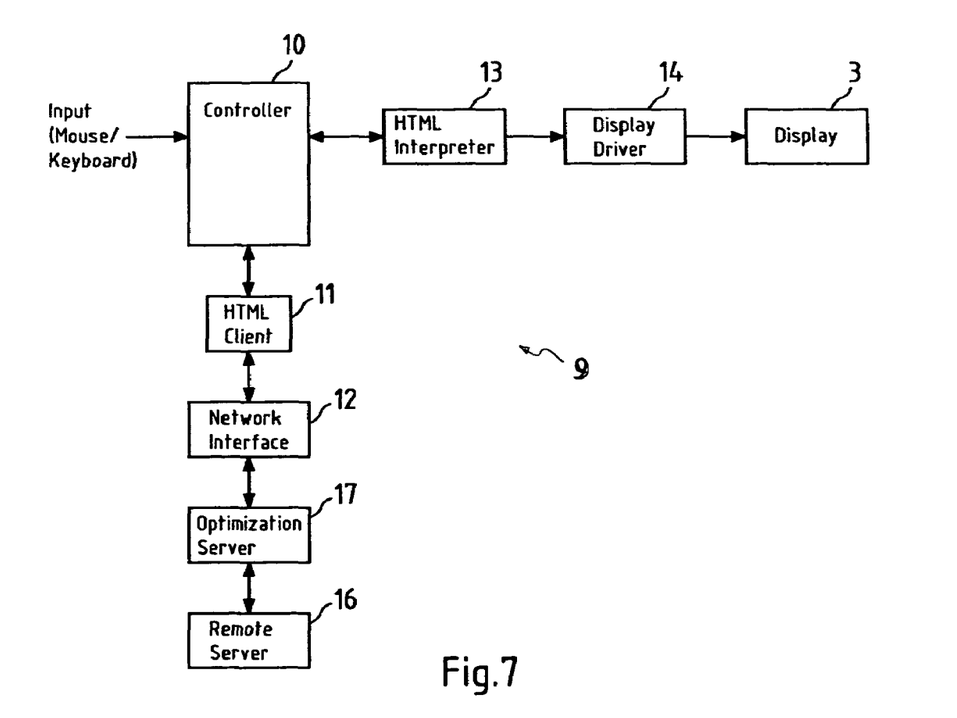
FIG. 7: the logical structure of a network element for improved portrayal of navigation objects according to the present invention.

FIG. 7 depicts the logical structure of a network element for improved portrayal of navigation objects according to the present invention. FIG. 7 basically shows the same logical elements of the device 9 according to FIG. 6. However, the device 9 no longer possesses an image map controller/interpreter instance 15. The functionality of this instance 15 is now shifted to an optimization server 17, that is located between the network interface 12 and the remote server. In effect, the parsing of web pages for image maps 1 and similar navigation objects is then performed by the optimization server 17, and accordingly changed HTML pages are then transferred via the network interface 12, so that image maps 1 that would be unrecognizable when being scaled to fit the display width/height of the device 9 are combined into a combined image map 4 by the optimization server 17. At the device 9 site, the changed HTML page is parsed by the HTML interpreter 13, the combined image map 4 is displayed (eventually with an additional icon 5), and when the combined image map 4 is selected by a user of the device 9, the original size image map 1 is fetched via the HTML client 11 and displayed on the display 3. It may also be possible that the optimization server 17 is implemented as an additional module that interacts with the remote server 16 only and is not logically embedded between the network interface 12 and the remote server 16.

The invention claimed is:

1. A method, comprising:
   scaling a web page that comprises an image map and further content to obtain a scaled web page, wherein said image map contains at least two image hyperlinks, making the scaled version of said image map in said scaled web page selectable as a whole;
   presenting said scaled web page on a display, and
   presenting only said image map with said at least two hyperlinks in unscaled format in response to a selection of said selectable scaled version of said image map.

2. The method according to claim 1, wherein each of said at least two image hyperlinks is associated with one respective target object that is displayed or executed upon selection of said respective image hyperlink.

3. The method according to claim 1, wherein said image hyperlinks are defined according to a markup language, in particular the HyperText Markup Language or derivatives thereof, and are interpreted by a browser.

4. The method according to claim 1, wherein for presenting said scaled web page, a first display window is used, and wherein for presenting said image map in unscaled format, a second display window is used.

5. The method according to claim 1, wherein both said presenting of said scaled web page and said presenting of said image map in unscaled format are performed in the same display window.

6. The method according to claim 1, wherein in said presenting of said image map in unscaled format, at least one of a horizontal and a vertical scroll bar is provided.

7. The method according to claim 1, further comprising determining whether said scaled version of said image map has to be made selectable as a whole or not.

8. A computer-readable medium having a computer program stored thereon, the computer program comprising instructions operable to cause a processor to perform the method of claim 1.

9. The computer-readable medium according to claim 8, wherein said computer program comprises a browser.

10. An apparatus comprising:
    a processor configured to scale a web page that comprises an image map and further content to obtain a scaled web page, wherein said image map contains at least two image hyperlinks, and further configured to make the scaled version of said image map in said scaled web page selectable as a whole; and
    a display configured to present said scaled web page, and further configured to present only said image map with said at least two hyperlinks in unsealed format in response to a selection of said selectable scaled version of said image map.

11. The apparatus according to claim 10, wherein said processor is further configured to determine whether said scaled version of said image map has to be made selectable as a whole or not.

12. The apparatus according to claim 10, wherein said display is configured to present said scaled web page in a first display window and to present said image map in unsealed format in a second display window.

13. The apparatus according to claim 10, wherein said display is configured to present both said scaled web page and said image map in unscaled format in the same display window.

14. The apparatus according to claim 10, wherein said display is configured to provide at least one of a horizontal and a vertical scroll bar when presenting said image map in unscaled format.

15. An apparatus comprising:
a processor configured to scale a web page that comprises an image map and further content to obtain a scaled web page, wherein said image map contains at least two image hyperlinks, and further configured to make the scaled version of said image map in said scaled web page selectable as a whole; and
an interface configured to transfer said scaled web page including said selectable scaled version of said image map to another apparatus configured to present said scaled web page, and to present only said image map with said at least two hyperlinks in unsealed format in response to a selection of said selectable sealed graphical representation of said image map.

16. The apparatus according to claim 15, configured to determine whether said scaled version of said image map has to be made selectable as a whole or not.

17. A method, comprising:
scaling a web page that comprises an image map and further content to obtain a scaled web page, wherein said image map contains at least two image hyperlinks, and further configured to make the scaled version of said image map in said scaled web page selectable as a whole; and
transferring said scaled web page including said selectable scaled version of said image map to another apparatus configured to present said sealed web page, and to present only said image map with said at least two hyperlinks in unscaled format in response to a selection of said selectable scaled graphical representation of said image map.

18. The method according to claim 17, further comprising determining whether said scaled version of said image map has to be made selectable as a whole or not, wherein said determining is performed by a device.

19. A computer-readable medium having a computer program stored thereon, the computer program comprising instructions operable to cause a processor to perform the method of claim 17.

20. A method, comprising:
receiving a scaled web page obtained by scaling a web page that comprises an image map and further content to obtain a scaled web page, wherein said image map contains at least two image hyperlinks, and wherein the scaled version of said image map in said scaled web page has been made selectable as a whole;
presenting said scaled web page on a display, and
presenting only said image map with said at least two hyperlinks in unsealed format in response to a selection of said selectable scaled version of said image map.

21. A computer-readable medium having a computer program stored thereon, the computer program comprising instructions operable to cause a processor to perform the method of claim 20.

22. The method according to claim 20, wherein for presenting said scaled web page, a first display window is used, and wherein for presenting said image map in unsealed format, a second display window is used.

23. The method according to claim 20, wherein both said presenting of said scaled web page and said presenting of said image map in unscaled format are performed in the same display window.

24. The method according to claim 20, wherein in said presenting of said image map in unscaled format, at least one of a horizontal and a vertical scroll bar is provided.

25. An apparatus comprising:
an interface configured to receive a scaled web page obtained by scaling a web page that comprises an image map and further content to obtain a scaled web page, wherein said image map contains at least two image hyperlinks, and wherein the scaled version of said image map in said scaled web page has been made selectable as a whole;
a display configured to present said scaled web page, and to present only said image map with said at least two hyperlinks in unscaled format in response to a selection of said selectable scaled version of said image map.

26. The apparatus according to claim 25, wherein said display is configured to present said scaled web page in a first display window and to present said image map in unsealed format in a second display window.

27. The apparatus according to claim 25, wherein said display is configured to present both said scaled web page and said image map in unscaled format in the same display window.

28. The apparatus according to claim 25, wherein said display is configured to provide at least one of a horizontal and a vertical scroll bar when presenting said image map in unscaled format.

* * * * *

UNITED STATES PATENT AND TRADEMARK OFFICE
CERTIFICATE OF CORRECTION

| | |
|---|---|
| PATENT NO. | : 7,594,194 B2 |
| APPLICATION NO. | : 10/671430 |
| DATED | : September 22, 2009 |
| INVENTOR(S) | : Mikko Mäkelä |

It is certified that error appears in the above-identified patent and that said Letters Patent is hereby corrected as shown below:

In column 10, line 57 (claim 10, line 10) "unsealed" should be --unscaled--.

In column 10, line 66 (claim 12, line 3) "unsealed" should be --unscaled--.

In column 11, line 35 (claim 17, line 10) "sealed" should be --scaled--.

In column 12, line 7 (claim 20, line 10) "unsealed" should be --unscaled--.

In column 12, line 15 (claim 22, line 3) "unsealed" should be --unscaled--.

In column 12, line 38 (claim 26, line 3) "unsealed" should be --unscaled--.

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,594,194 B2  Page 1 of 1
APPLICATION NO. : 10/671430
DATED : September 22, 2009
INVENTOR(S) : Mikko Mäkelä

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1012 days.

Signed and Sealed this

Fourteenth Day of December, 2010

David J. Kappos
*Director of the United States Patent and Trademark Office*